United States Patent [19]

Higashiya et al.

[11] Patent Number: 5,636,081
[45] Date of Patent: Jun. 3, 1997

[54] MAGNETIC DISC APPARATUS AND MAGNETIC DISC

[75] Inventors: Teruyoshi Higashiya, Kanagawa-ken; Tuneyuki Hasegawa, Odawarra; Masayuki Katsumoto, Kodaira; Yuichi Otani, Yokohama; Mituhiko Oguchi, Ebina; Hiroyuki Sugimoto, Odawara; Tetsuji Higashijima, Odawara; Takashi Hamada, Odawara; Kinya Eguchi, Fujisawa; Hideaki Amano, Odawara, all of Japan

[73] Assignee: Hitachi, Ltd., Tokyo, Japan

[21] Appl. No.: 307,996

[22] Filed: Sep. 16, 1994

[30] Foreign Application Priority Data

Sep. 20, 1993 [JP] Japan ................... 5-233387

[51] Int. Cl.⁶ .................. G11B 33/14; G11B 5/012; G11B 17/00
[52] U.S. Cl. .................. 360/97.02; 360/97.01
[58] Field of Search ................. 360/97.02, 97.01; 428/694 AH, 694 TP, 694 TZ, 694 BP

[56] References Cited

U.S. PATENT DOCUMENTS 4,789,913  12/1988  Gregory et al. ............ 360/97.02
4,988,903   1/1991  Koriyama ................... 360/97.02
5,030,260   7/1991  Beck et al. ................. 360/97.02
5,282,101   1/1994  Reinisch .................... 360/97.02

FOREIGN PATENT DOCUMENTS 63-103425A  9/1988  Japan.
A4132072    5/1992  Japan.
2198280     6/1988  United Kingdom.

*Primary Examiner*—John P. Wolff
*Assistant Examiner*—Adriana Glordana
*Attorney, Agent, or Firm*—Kenyon & Kenyon

[57] ABSTRACT

A magnetic disc apparatus includes a casing for defining a sealed space, a magnetic disc disposed within the space, a spindle to which the magnetic disc is fixed, a motor for rotating the spindle, a flying head slider for writing and/or reading information in and/or from the magnetic disc and a carriage for translating the flying head slider. The magnetic disc apparatus incorporates an organic chemical compound capable of suppressing siloxane from being chemically changed to silicon oxide. The organic chemical compound contains at least one of monoalkyl-substituted benzene, dialkyl-substituted benzene, trialkyl-substituted benzene, fatty acid, fatty ester, alkyl ester of aromatic acid, thiazoles and phenols.

2 Claims, 7 Drawing Sheets

MAGNETIC DISC APPARATUS AND MAGNETIC DISC

BACKGROUND OF THE INVENTION

The present invention relates to a magnetic disc apparatus and a magnetic disc.

Heretofore, magnetic disc apparatus tend to reduce a spacing between a flying head slider and a magnetic disc in order to realize a high density recording. Also, magnetic disc apparatus tend to rotate a disc rotating spindle at high speed in order to shorten an information transfer time. Concurrently therewith, if floating dust existing within the magnetic disc apparatus and powders produced when assembly parts composing the magnetic disc apparatus are worn enter into the spacing between a lifting force generating surface of a slider rail of the flying head slider and the magnetic disc, recorded information can not be read out temporarily. Also, if the surface of the slider rail is smudged with dust and oily mists, the flying head slider can not skim stably. There is then the increasing risk that the magnetic disc apparatus will be damaged by a destructive sliding accident.

Recently, the spacing between the flying head slider and the magnetic disc is reduced more. There is then another problem that a so-called head crash is caused even by gas generated from parts of the magnetic disc apparatus. Silicon rubber packings that had been used so far to hermetically seal the magnetic disc apparatus contain large amounts of siloxane which is instantaneously chemically changed to hard silicon oxide by heating. The concentration of siloxane gas increases as a temperature within the magnetic disc apparatus rises. The moment the flying head slider and the magnetic disc contact with each other, the heat is generated from friction. This frictional heat has energy sufficient to promote a chemical change from siloxane to silicon oxide. When the silicon oxide is generated by the contact between the flying head slider and the magnetic disc, there lies a hard substance (i.e., silicon oxide) between the flying head slider and the magnetic disc with the result that a destructive head crash occurs. To solve this problem, in Japanese laid-open patent publication No. 4-132072 the silicon rubber that had been so far employed as the packing of the magnetic disc apparatus is replaced with a fluoro rubber which generates less siloxane gas.

If the packing of the magnetic disc apparatus is made of the fluoro rubber instead of the silicon rubber, then it becomes possible to effectively suppress the siloxane gas from being generated within the magnetic disc apparatus. Further, if the magnetic disc apparatus incorporates a gas adsorbent, then it becomes possible to effectively remove siloxane gas generated from the inside of the magnetic disc apparatus and/or entered into the magnetic disc apparatus from the outside. However, in as much as the magnetic disc apparatus is miniaturized progressively, the magnetic disc apparatus cannot provide a sufficient space for incorporating a sufficient amount of gas adsorbent. Furthermore, to make the magnetic disc apparatus high in reliability, it is important and desirable to prevent the head crash from taking place even when the siloxane gas exists within the magnetic disc apparatus.

SUMMARY OF THE INVENTION

The present invention provides a magnetic disc apparatus and a magnetic disc in which a trouble, such as a head crash or the like, can be avoided even when siloxane gas exists within the magnetic disc apparatus.

To this end, according to one aspect of the present invention, there is provided a magnetic disc apparatus which is comprised of a casing for defining a sealed space, a magnetic disc disposed within the space, a spindle to which the magnetic disc is fixed, a motor for rotating the spindle, a flying head slider for writing and/or reading information in and/or from the magnetic disc, a carriage for translating the flying head slider, and a device for supplying organic gas containing at least one of monoalkyl-substituted benzene, dialkyl-substituted benzene, trialkyl-substituted benzene, fatty acid, fatty ester, alkyl ester of aromatic acid, thiazoles and phenols to the space.

According to another aspect of the present invention, there is provided a magnetic disc which is comprised of a substrate, a magnetic recording layer coated on the substrate, and a lubricant layer containing at least one of monoalkyl-substituted benzene, dialkyl-substituted benzene, trialkyl-substituted benzene, fatty acid, fatty ester, alkyl ester of aromatic acid, thiazoles and phenols, the lubricant layer being coated on the magnetic recording layer.

DETAILED DESCRIPTION

Figure 1:
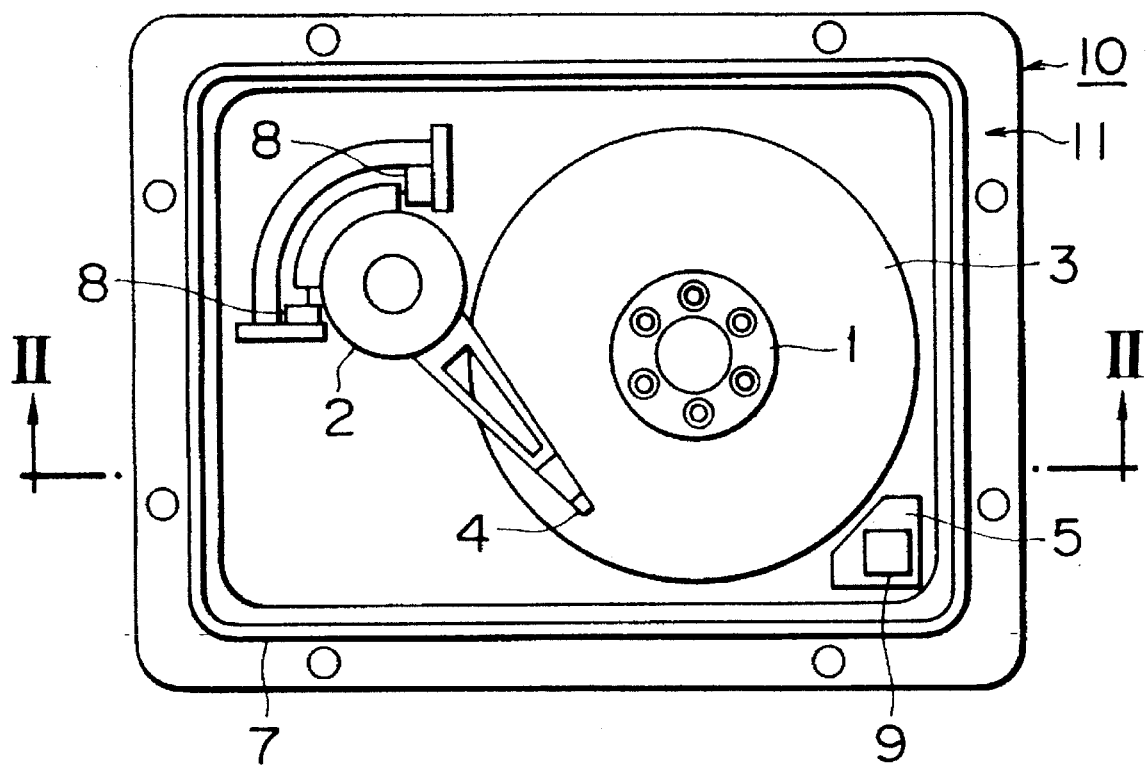
FIG. 1 is a plan view of a magnetic disc apparatus according to a first embodiment of the present invention.
Figure 2:
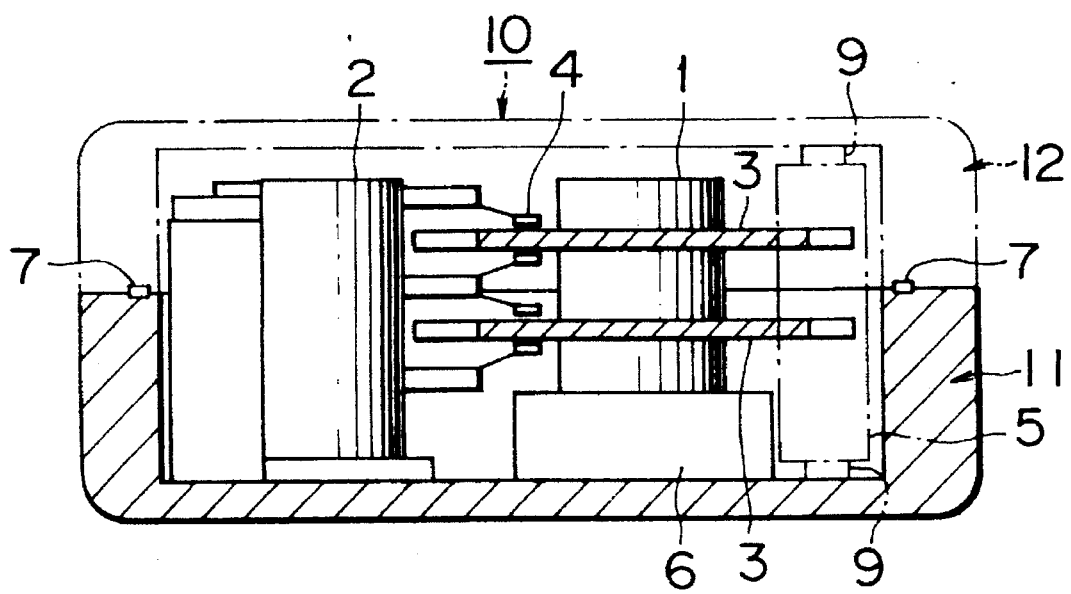
FIG. 2 is a cross-sectional view taken along the line II—II in FIG. 1.

As shown in FIGS. 1 and 2 of the accompanying drawings, a magnetic disc apparatus 10 according to a first embodiment of the present invention comprises a housing 11 and a housing cover 12. The housing 11 and the housing cover 12 are joined to each other through a packing 7 to define therebetween a hermetically-sealed interior space. The magnetic disc apparatus 10 houses magnetic discs 3, a disc rotating spindle 1 having the magnetic discs 3 fixed thereto, a motor 6 for rotating the spindle 1, flying head sliders 4 for reading and/or writing information from and/or to the magnetic discs 3 and a carriage 2 for swinging the flying head sliders 4. The carriage 2 includes a pair of stoppers 8. The magnetic disc apparatus 10 further incorporates an air filter 5 for removing dust that floats therein. The air filter 5 is supported through filter supports 9 by the housing 11 and the housing cover 12.

According to this embodiment, the packing 7, the stoppers 8 and the filter supports 9 are made of the ethylene-propylene rubber containing acrylic monomer, tolyl acetate, phenol and isopropylphenol. These members supply organic gas to the inside of the magnetic disc apparatus 10.

The reason that the packing 7, the stoppers 8 and the filter supports 9 are all made of the ethylene-propylene rubber is that large amounts of organic compound can be added to the ethylene-propylene rubber in the manufacturing process. While the magnetic disc apparatus 10 is hermetically sealed by the packing 7 as described above, the present invention is not limited thereto and it is possible to hermetically seal the magnetic disc apparatus 10 by using a seal tape containing the above-mentioned organic chemical compounds. In this case, organic gas is supplied to the inside of the magnetic disc apparatus 10 from the seal tape, the stoppers and the filter supports.

Figure 3:
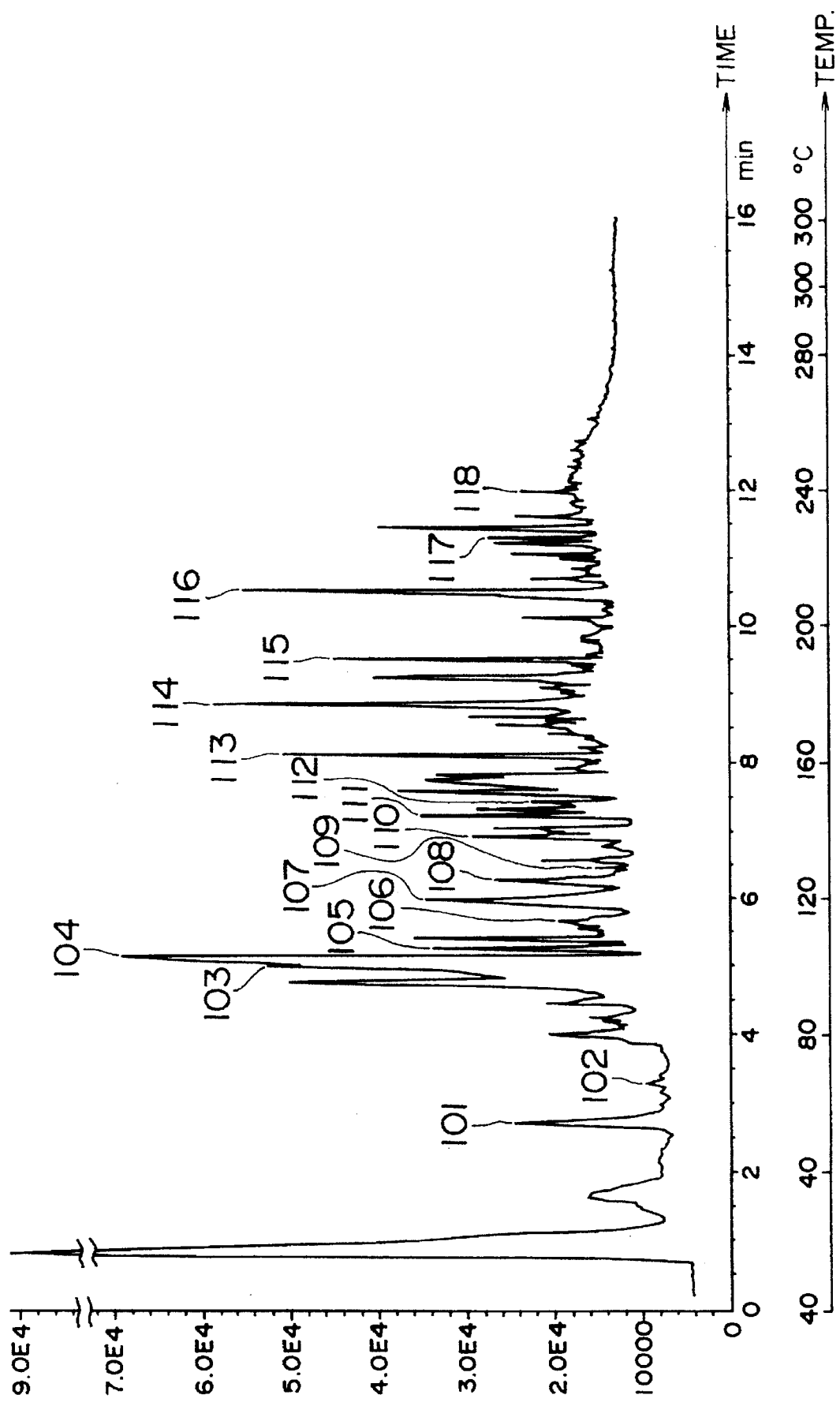
FIG. 3 is a graph showing analyzed results of gas existing within the magnetic disc apparatus shown in FIG. 1.

FIG. 3 shows analysis results obtained when gas generated in the inside of the magnetic disc apparatus 10 according to this embodiment was collected and analyzed with a gas chromatography apparatus apparatus during operation of the magnetic disc apparatus 10. This gas chromatography employs a column manufactured by Hewlett-Packard under the product name, HP-1 (12 min length and 0.2 mm in inner diameter). The column was kept at 40° C. for 2 minutes after sample gas had been injected into the magnetic disc apparatus 10, and then heated up to 300° C. at a rate of 20° C./minute. Chemical compositions were identified by a mass selective detector manufactured by Hewlett-Packard under the product name, HP5970B. The chemical compositions corresponding to the peaks in FIG. 3 are identified as shown on the table 1.

TABLE 1

| Peak Nos. | Compounds |
| --- | --- |
| 101 | toluene |
| 102 | N,N-dimethylformamide |
| 103 | acrylic monomer: methacrylate |
| 104 | trimethylheptatoluene |
| 105 | β-methylstyrene |
| 106 | phenol |
| 107 | acetophenone |
| 108 | isopropylphenol |
| 109 | methyl benzoate |
| 110 | tolyl acetate |
| 111 | octyl acetate |
| 112 | benzothiazole |
| 113 | tridecane |
| 114 | tetradecane |
| 115 | pentadecane |
| 116 | diisopropyl ester adipate |
| 117 | fragment ions 118, 209, 224 |
| 118 | ester phthalate |

Study of the above-mentioned analyzed results reveals that the magnetic disc apparatus 10 contains a variety of gas components which includes acrylic monomer (peak 103), phenol (peak 106) isopropylphenol (peak 108), and tolyl acetate (peak 110).

Figure 4:
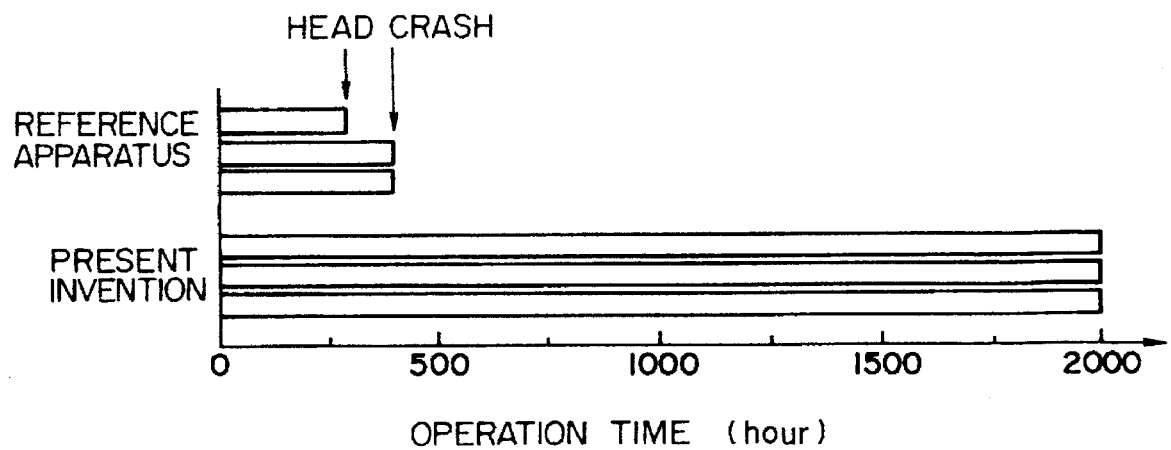
FIG. 4 is a graph showing the results of comparative experiments.

To confirm that the magnetic disc apparatus 10 according to this embodiment can be protected from being affected by siloxane gas, comparative experiments were carried out by using three magnetic disc apparatus 10 according to this embodiment and three reference magnetic disc apparatus having the packing 7, the stoppers 8 and the filter support 9 each made of fluoro rubber. These apparatus were continuously operated in a thermostatic oven with siloxane gas atmosphere at a temperature of 20° C. and a humidity of 40%. FIG. 4 shows the results of the comparative experiments. The siloxane gas generating source is dimethylsiloxane tetramer. The reference magnetic disc apparatus is of a similar arrangement to the magnetic disc apparatus 10 except the material of the packing 7, the stoppers 8 and the filter support 9.

The reference magnetic disc apparatus suffers from a trouble, such as a head crash or the like, after about 300-hours of continuous operation, while the magnetic disc apparatus 10 can be protected from being damaged by such a trouble during 2000-hours of continuous operation. Therefore, it is clear from the results that the magnetic disc apparatus 10 having the packing 7, the stoppers 8 and the filter support 9 each made of the ethylene-propylene rubber containing the aforesaid organic chemical compounds can be protected from the influence of siloxane gas. In the experiments, no trouble occurred in the magnetic disc apparatus 10 according to this embodiment until 2000 hours elapsed and satisfactory experimental results can be obtained at the moment. Therefore, the test was finished just at 2000 hours.

Figure 5:
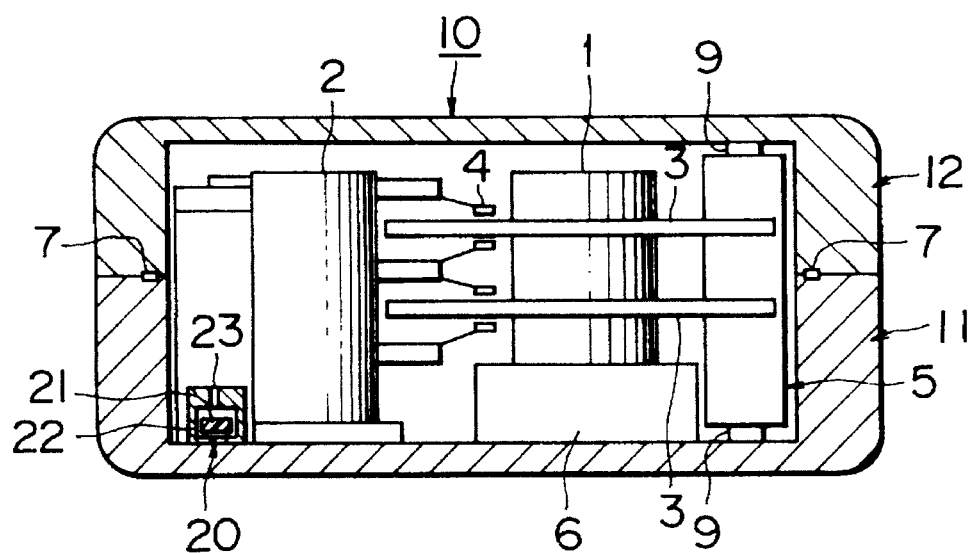
FIG. 5 is a cross-sectional view of a magnetic disc apparatus according to a second embodiment of the present invention.

A magnetic disc apparatus 10 according to a second embodiment incorporates an organic gas generator 20 as shown in FIG. 5. A rest of the arrangement thereof is similar to that of the magnetic disc apparatus 10 according to the first embodiment. The organic gas generator 20 comprises a container 22 with a small aperture 23 bored therethrough to diffuse organic gas and a resin material 21 containing tolyl acetate accommodated in the container 22. The organic gas generator 20 can continuously supply the organic gas into an interior of the magnetic disc apparatus 10 for a long time because the organic gas is diffused 10 through the small aperture 23.

The magnetic disc apparatus 10 according to this embodiment was operated within a thermostatic oven with the siloxane gas atmosphere in which a temperature was set to 20° C. and a humidity was set to 40% and then compared with the reference magnetic disc apparatus having no organic gas generator in order to investigate improvements against the siloxane gas troubles. Dimethylsiloxan etetramer was used as the siloxane gas generating source.

In order to hasten an occurrence of the siloxane gas trouble, the experiments were carried out under the condition that a head lifting amount is reduced and a head whose rail width is narrower than that of the commercially-available head is used. Experimental results show that, while the disc surface of the magnetic disc of the reference magnetic disc apparatus having no tolylacetate gas generating source is damaged in less than 30 minutes to the extent that the damaged disc surface can be visually confirmed, the disc surface of the magnetic disc of the magnetic disc apparatus of this embodiment was very slightly smudged even after 3-hour operation. Study of the experimental results reveals that the magnetic disc apparatus 10 with the tolylacetate generating source according to this embodiment can be protected from the siloxane gas trouble substantially perfectly.

While the packing 7, the stoppers 8 and the filter supports 9 are made of the fluoro rubber as described above, as is clear from the experimental results, the magnetic disc apparatus 10 according to the present invention can be protected from being affected by the siloxane gas. Therefore, the packing 7, the stoppers 8 and the filter support 9 of this magnetic disc apparatus 10 can be made of the silicon rubber.

The organic gas generator 20 need not always be disposed within the magnetic disc apparatus 10 and may be disposed in the outside of the magnetic disc apparatus 10. In this case, it is possible to supply the organic gas into the inside of the magnetic disc apparatus by communicating a small aperture bored at least either in the housing 11 or the housing cover 20 with the small aperture 23 of the organic gas generator 20.

Figure 6:
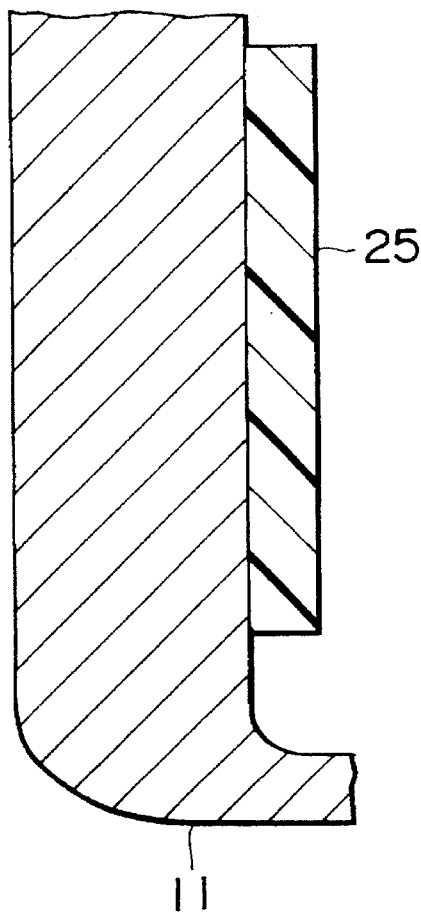
FIGS. 6 and 7 are enlarged fragmentary sectional views of modified examples of the second embodiment of the present invention, respectively.
Figure 7:
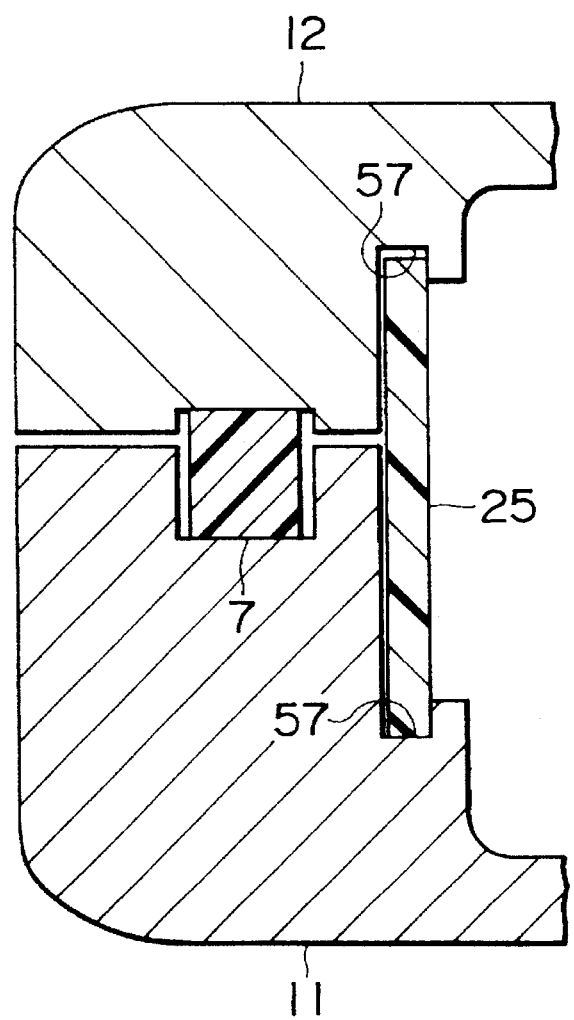

Instead of the organic gas generator 20, it is possible to attach a resin plate which can generate organic gas to the inside of the magnetic disc apparatus. As the resin plate, it is possible to use the ethylene-propylene rubber containing acrylic monomer, tolylacetate, phenol and isopropylphenol. As shown in FIG. 6, a resin plate 25 is bonded to the inner wall of the housing 11 by an adhesive agent. Alternatively, as shown in FIG. 7, engagement portions 57 are formed in the housing 11 and the housing cover 12, to which, the resin plate 25 is fitted to cover the connected portion between the housing 11 and the housing cover 12. If so, then the resin plate 25 serves as the organic gas generating source. Thus, without providing the organic gas generator 20, it is possible to effectively prevent the silicon oxide from being generated similarly to the second embodiment of the invention. Furthermore, the resin plate 25 may be bonded to the inner wall of the housing 11 by an adhesive tape.

Figure 8:
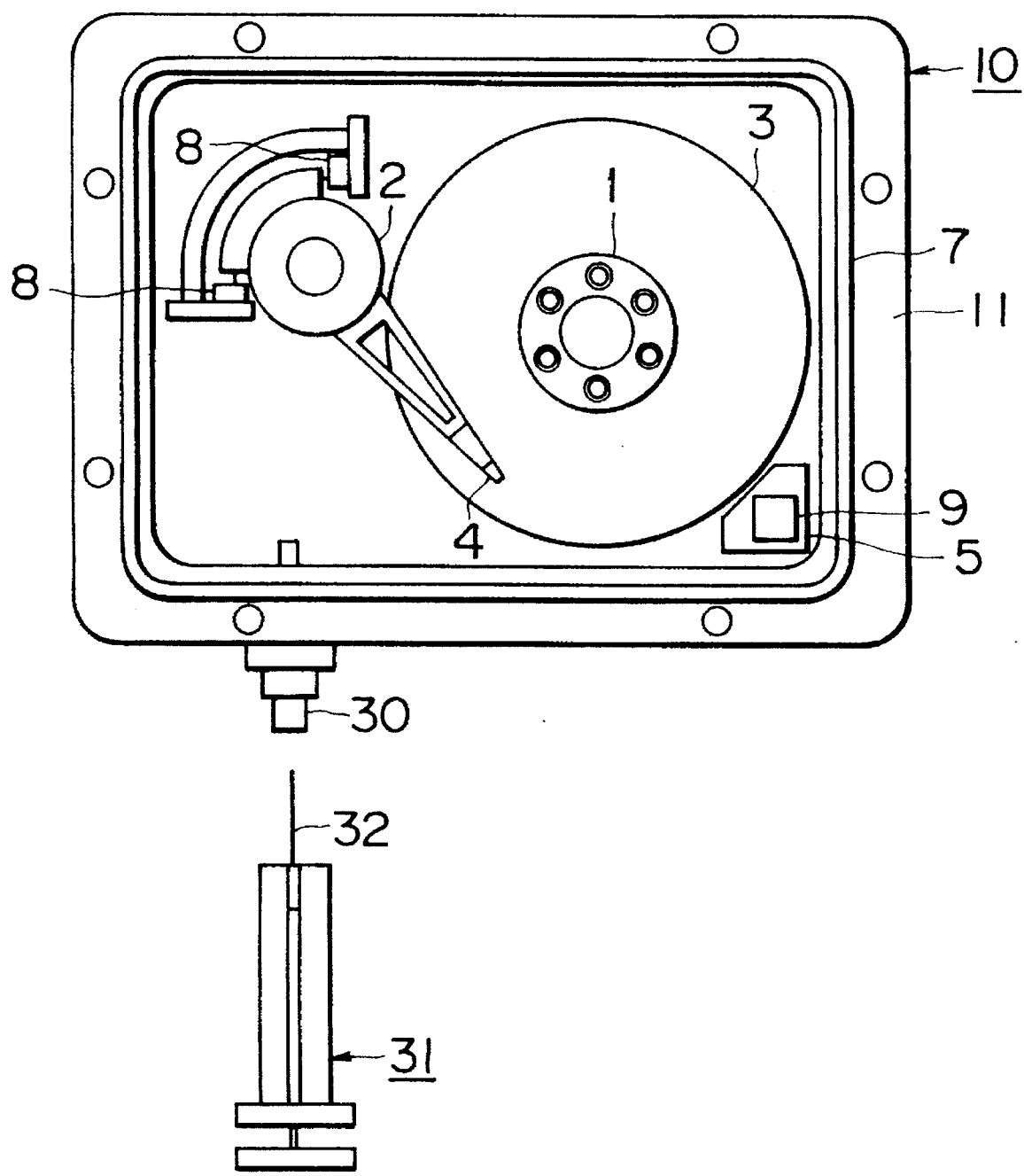
FIG. 8 is a plan view showing a magnetic disc apparatus according to a third embodiment of the present invention.

A magnetic disc apparatus 10 according to a third embodiment includes the housing 11 which is provided with a plug 30 as shown in FIG. 8. The packing 7, the stopper 8 and the filter support 9 of the magnetic disc apparatus 10 according to this embodiment are made of the fluoro rubber. However, as is clear from the above-mentioned experimental results, the magnetic disc apparatus 10 can be prevented from being influenced by the siloxane gas, and then the packing 7, the stopper 8 and the filter support 9 may be made of the silicon rubber. The rest of the arrangement of the third embodiment is the same as that of the first embodiment. The plug 30 may be attached to the housing cover 12.

As shown in FIG. 8, it is possible to inject organic gas into the inside of the magnetic disc apparatus 10 from the outside by inserting a needle 32 of a syringe 31 into the plug 30. According to this embodiment, tolyl-acetate gas can be introduced into the syringe 31 and supplied through the plug 30 to the inside of the magnetic disc apparatus 10. The occurrence of the siloxane gas trouble was investigated and then experimental results were obtained that were similar to those of the magnetic disc apparatus 10 according to the second embodiment. Incidentally, a valve device may be used instead of the plug 30.

Figure 9:
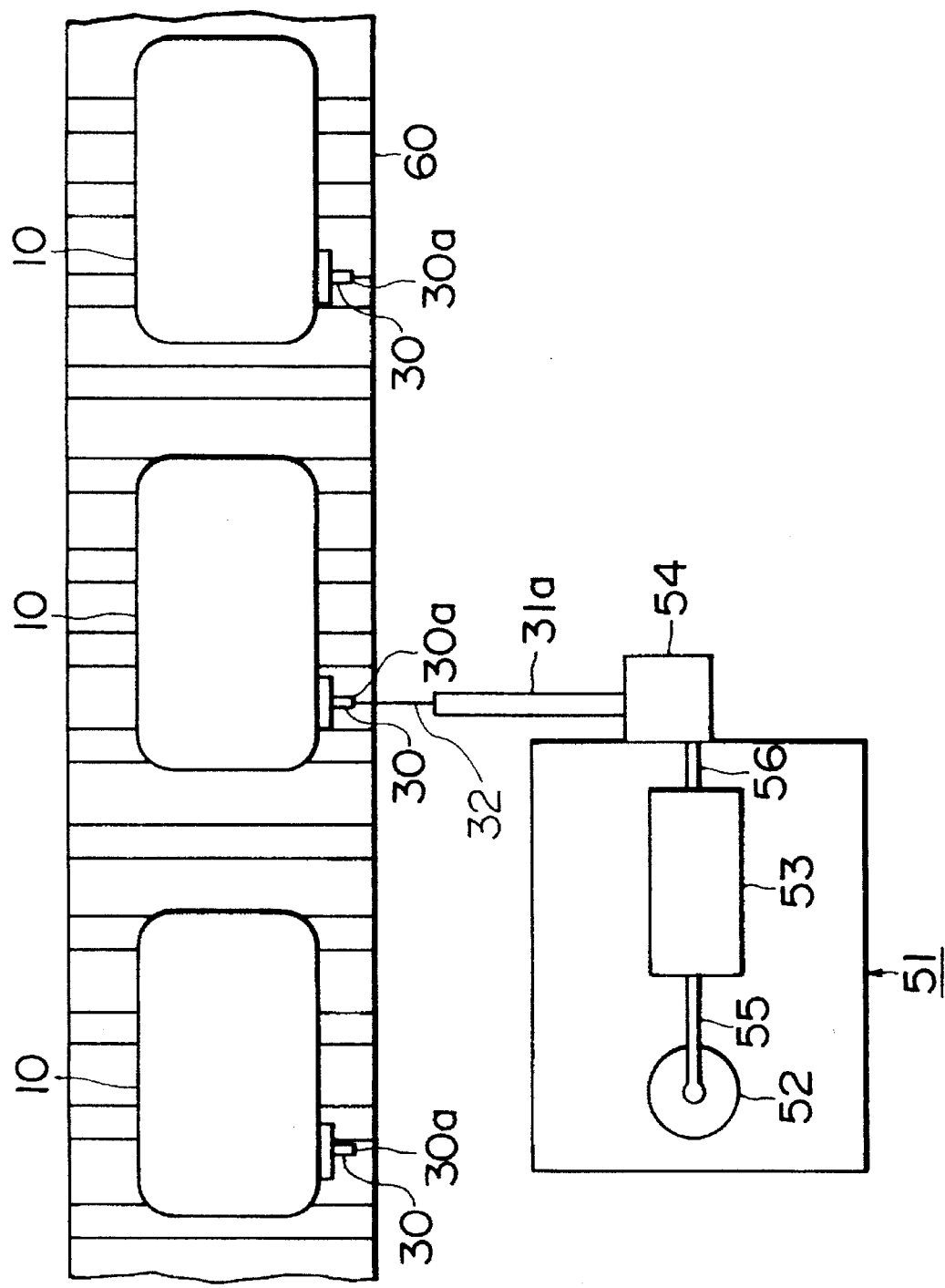
FIG. 9 is a schematic diagram showing procedures of how to inject gas into the magnetic disc apparatus according to the third embodiment of the present invention.

Further, while the organic gas is injected into the inside of the magnetic disc apparatus 10 by using the syringe 31 as described above, the present invention is not limited thereto and it is possible to inject the organic gas into the inside of the magnetic disc apparatus 10 by using an organic gas injecting apparatus. As shown in FIG. 9, an organic gas injecting apparatus 51 comprises a tolyl acetate gas cylinder 52, a syringe unit 31a for injecting the tolyl acetate gas into the inside of the magnetic disc apparatus 10, an adjustment unit 53 for adjusting an amount of the organic gas to be injected and a syringe control unit 54 for moving the syringe unit 31a. The gas cylinder 52 and the adjustment unit 53 communicate with each other via a gas pipe 55, and the adjustment unit 53 and the syringe control unit 54 communicate with each other via a gas pipe 56.

The adjustment unit 53 supplies a predetermined amount of the tolyl acetate gas from the gas cylinder 52 to the gas pipe 56.

A number of magnetic disc apparatus 10 with the plug 30 are placed on a belt conveyor 60 at equal intervals and are conveyed by the conveyor 60. The belt conveyor 60 is so controlled by a mechanism (not shown) as to continuously repeat a series of operations such that the belt conveyor 60 moves by a predetermined distance (i.e., distance equal to the interval between the plugs 30 of the magnetic disc apparatus 10), and then stops for a predetermined time period.

The syringe control unit 54 displaces the syringe unit 31a in the longitudinal direction. Namely, the syringe control unit 54 controls the introduction of the organic gas to the syringe unit 31a and the discharge of the organic gas from the syringe unit 31a. Specifically, under the control of the syringe control unit 54, the syringe unit 31a repeats at every predetermined time (i.e., time equal to the moving time of the belt conveyor 60) a series of operations such that the syringe unit 31a is moved forward after a predetermined amount of organic gas supplied from the adjustment unit 53 is introduced into a cylinder of the syringe unit 31, the syringe unit 31a then discharges the organic gas accumulated in the cylinder from a needle 32 by moving a piston of the syringe unit 31, the syringe unit 31a is moved back and the piston is also moved back.

When a needle insertion portion 30a of the plug 30 abuts against the tip end portion of the needle 32 of the syringe portion 31a after the magnetic disc apparatus 10 is conveyed by the belt conveyor 60, the belt conveyor 60 is halted during a predetermined time period. Within such time period the syringe control unit 54 executes the above series of operations, whereby the organic gas of the predetermined amount is injected through the plug 30 into the magnetic disc apparatus 10. After such time period elapses, the belt conveyor 60 moves is the predetermined distance and then halted again for the predetermined time. At that moment, since the needle insertion unit 30a of the plug 30 of the magnetic disc apparatus abuts against the tip end portion of the needle 32 of the syringe unit 31a, it is possible to successively inject the organic gas of the predetermined amount into a plurality of magnetic disc apparatus 10 by repeating the above series of operations.

Figure 10:
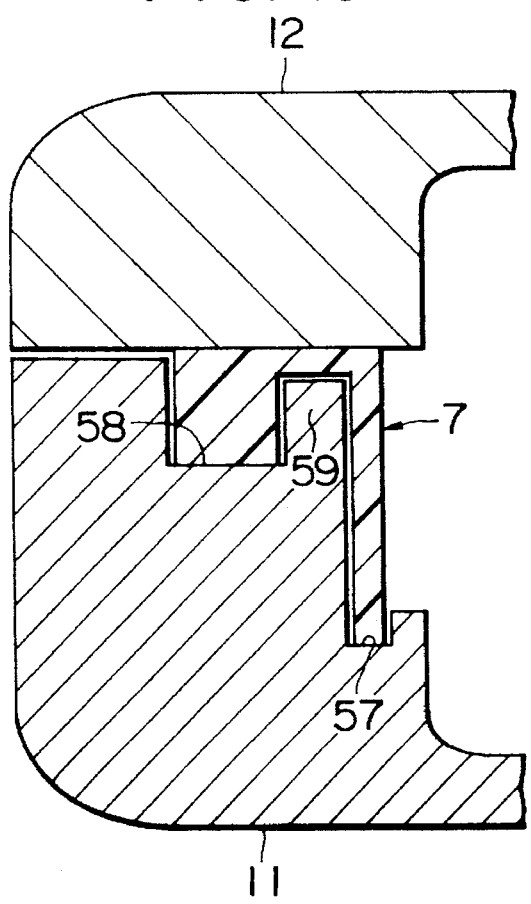
FIG. 10 is an enlarged fragmentary sectional view of a magnetic disc apparatus according to a fourth embodiment of the present invention.

The magnetic disc apparatus 10 according to a fourth embodiment of the present invention will be described below with reference to FIG. 10. As shown in FIG. 10, the engagement portion 57 is formed on the inner wall of the housing 11 and the height of a convex portion 59 between a groove 58 and the engagement portion 57 is reduced as compared with the related art, thereby forming a concave portion continued from the groove 58 to the inner wall of the housing 11. If the packing 7 is shaped following the shape of such concave portion, then the packing 7 can be exposed on the inner wall of the housing 11. According to this embodiment, the packing 7 is made of the ethylene-propylene rubber containing acrylic monomer, tolyl acetate, phenol and isopropylphenol. The rest of the arrangement of the magnetic disc apparatus 10 according to the fourth embodiment is similar to that of the reference magnetic disc apparatus that has been described so far in the first embodiment of the present invention.

Because the packing 7 is exposed on the inside of the magnetic disc apparatus 10, the organic gas can effectively be discharged from the packing 7 into inside of the magnetic disc apparatus 10. The magnetic disc apparatus 10 according to this embodiment was tested by a method similar to that used to test the first embodiment and it was found that similar effects can be achieved and that the above-mentioned arrangement of the magnetic disc apparatus 10 is effective for preventing the silicon oxide from being generated.

Figure 11:
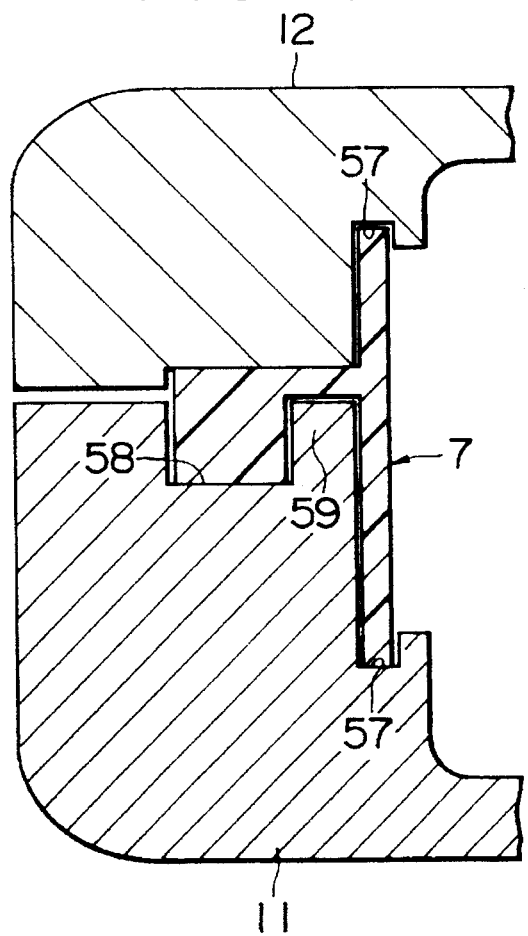
FIG. 11 is an enlarged fragmentary sectional view of a modified example of the fourth embodiment according to the present invention.

If the engagement portions 57 are formed in both the housing 11 and the housing cover 12 so that the packing 7 covers the inner walls of the housing 11 and the housing cover 12 as shown in FIG. 11, then the area of the exposed part of the packing 7 is further increased and therefore the organic gas can be more effectively discharged from the packing 7 into the inside of the magnetic disc apparatus 10.

A fifth embodiment of the present invention will be described below. According to this embodiment, the magnetic disc is provided at a surface thereof with a layer containing an organic chemical compound, and the magnetic disc itself serves as the organic gas generating source of the magnetic disc apparatus. While tolyl acetate is employed as the organic chemical compound in this embodiment, the present invention is not limited thereto and it is possible to employ any one of the compounds used in the second embodiment. When the magnetic disc itself serves as the organic gas generating source, it is possible to effectively prevent the silicon oxide from being generated in a manner similarly to that for the second embodiment of the present invention.

A magnetic disc manufacturing process is composed of a magnetic recording layer forming process and a surface treatment process. Initially, in the magnetic recording layer forming process, a magnetic material is coated on a substrate. After a magnetic field orientation process is executed, the substrate is dried to form a magnetic recording layer. In the surface treatment process, after the magnetic recording layer is subjected to mirror finishing a lubricant is applied to the magnetic recording layer to obtain a magnetic disc.

Figure 12:
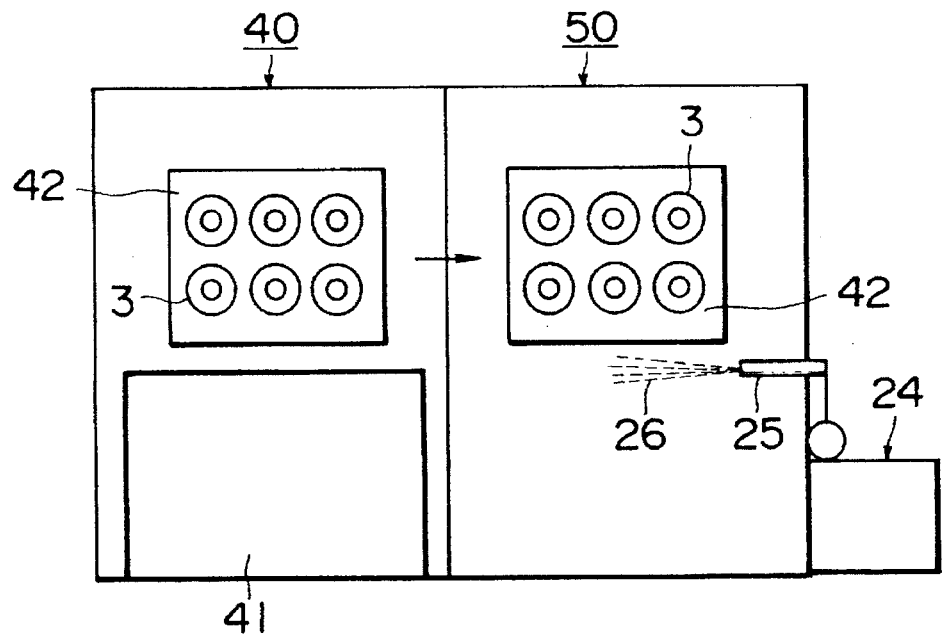
FIG. 12 is a schematic diagram showing a gas adsorbing process of the magnetic disc.

A gas supplying apparatus 50 in which the magnetic disc 3 adsorbs a gas is disposed adjacent to a lubricant applying apparatus 40 as shown in FIG. 12. The magnetic disc from the lubricant applying process is adapted to adsorb the gas. The lubricant applying apparatus 40 includes a lubricant tank 41 which accommodates a lubricant. The magnetic disc 3 supported by a disc holder 42 is submerged into the lubricant accommodated in the lubricant tank 41 and a lubricant film is formed on the magnetic disc 3.

After the lubricant applying process, the magnetic disc 3 supported by the disc holder 42 is conveyed into the gas supplying apparatus 50. The gas supplying apparatus 50 includes a gas supplying device 24. The gas supplying device 24 includes a cylinder (not shown) in which tolyl acetate gas is accommodated and a nozzle 25 for discharging the tolyl acetate gas. When the magnetic disc 3 is conveyed into the gas supplying apparatus 50, tolyl acetate gas 26 is discharged from the nozzle 25 of the gas supplying device 24 to thereby place the inside of the gas supplying apparatus 50 in the tolyl acetate gas atmosphere. Thus, the tolyl acetate gas 26 is adsorbed to the lubricant film formed on the magnetic disc 3 supported by the disc holder 42. Therefore, it is possible to manufacture the magnetic disc 3 which can serve as the organic gas generating source.

In the magnetic head manufacturing process, in the surface treatment process for parts used within the magnetic disc apparatus, in the installation for assembling the magnetic discs to the spindle or in the magnetic disc conveying line, if the installations which carry out the above-mentioned processes are covered with some suitable means and an organic gas of one of the aforementioned kinds is supplied to the installations or the organic gas is generated by and confined within the organic gas generating source disposed within the installations, the organic gas is adsorbed to the surfaces of the parts used within the magnetic disc apparatus and then similar effects can achieved.

As the organic chemical compound which can prevent the siloxane gas from being chemically changed to the silicon oxide, there should preferably be used monoalkyl-substituted benzene, dialkyl-substituted benzene, trialkyl-substituted benzene, thiazoles or phenols. As the alkyl-substituted benzene, there should preferably be used chemical compounds expressed by chemical formula, $C_9H_{12}$ or $C_{10}H_{14}$, e.g., propyl benzene, ethyl methyl benzene, diethyl benzene, trimethyl benzene, methyl propyl benzene and ethyl dimethyl benzene. Further, as the phenols, there should preferably be used phenol, isopropylphenol, isopropenyl phenol and tert-butyl hydroxy toluene.

Boiling points of these chemical compounds are 150° C. or higher. Therefore, if even 0.1 ppm of these chemical compound gases exists within the magnetic disc apparatus, gases of these chemical compounds are adsorbed to the lifting force generating surface of the head slider or the magnetic disc, so that a rise of temperature at a contacting portion between the magnetic disc and the head slider can be suppressed, thereby preventing the siloxane gas from being chemically changed to the silicon oxide.

As set out, according to the present invention, it is possible to remove the risk that the destructive head crash will be caused by the siloxane gas trouble. Therefore, it is possible to provide a magnetic disc apparatus which is high in reliability.

What is claimed is:

1. A magnetic disc apparatus comprising:

a casing defining a sealed space;

a magnetic disc disposed within said sealed space;

a spindle to which said magnetic disc is fixed;

a motor coupled to said spindle;

a flying head slider disposed above said magnetic disk;

a positioner coupled to said flying head slider; and an organic gas source disposed within said space, the organic gas preventing siloxane from being chemically changed to silicon oxide.

2. A magnetic disc apparatus comprising:

a casing defining a sealed space, said casing including a sealing member made of a material which results in the formation of siloxane;

a magnetic disc disposed within said sealed space;

a spindle to which said magnetic disc is fixed;

a motor coupled to said spindle;

a flying head slider disposed above said magnetic disk;

a positioner coupled to said flying head slider; and an organic gas source disposed within said space, the organic gas preventing the siloxane formed by said sealing member from being chemically changed to silicon oxide, whereby the reliability of said magnetic disk apparatus is substantially increased.

* * * * *

UNITED STATES PATENT AND TRADEMARK OFFICE
CERTIFICATE OF CORRECTION

PATENT NO. : 5,636,081
DATED : June 3, 1997
INVENTOR(S) : Teruyoshi Higashiya, et. al.

It is certified that error appears in the above-identified patent and that said Letters Patent is hereby corrected as shown below:

| Column | Line | |
|---|---|---|
| 3 | 21 | Delete "apparatus" (second occurrence). |
| 6 | 31 | After "moves" delete "is"; after "and" insert --is--. |

Signed and Sealed this

Tenth Day of February, 1998

Attest:

BRUCE LEHMAN

*Attesting Officer*    *Commissioner of Patents and Trademarks*